W. J. COVINGTON.
Planting-Attachments for Harrows.
No. 158,040.                  Patented Dec. 22, 1874.
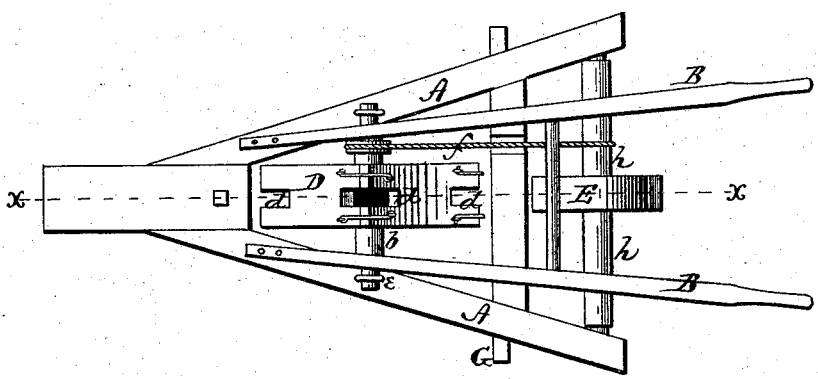
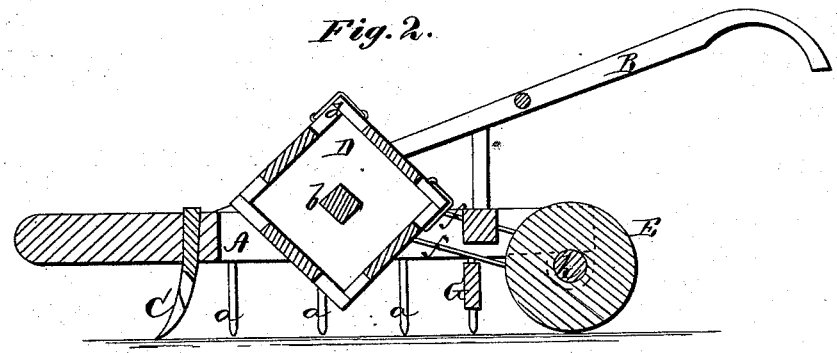
WITNESSES
Henry N. Miller
C. L. Evert
INVENTOR
W<sup>m</sup> J. Covington
per
Alexander Mason
Attorneys

UNITED STATES PATENT OFFICE.

WILLIAM J. COVINGTON, OF CRYSTAL SPRINGS, MISSISSIPPI.

IMPROVEMENT IN PLANTING ATTACHMENTS FOR HARROWS.

Specification forming part of Letters Patent No. 158,040, dated December 22, 1874; application filed September 23, 1874.

*To all whom it may concern:*

Be it known that I, WILLIAM J. COVINGTON, of Crystal Springs, in the county of Copiah and in the State of Mississippi, have invented certain new and useful Improvements in Attachment for Harrows; and do hereby declare that the following is a full, clear, and exact description thereof, reference being had to the accompanying drawings, and to the letters of reference marked thereon, making a part of this specification.

The nature of my invention consists in the construction and arrangement of a cotton-seed-planting attachment for harrows, as will be hereinafter more fully set forth.

In order to enable others skilled in the art to which my invention appertains to make and use the same, I will now proceed to describe its construction and operation, referring to the annexed drawing, in which—

Figure 1 is a plan view of a harrow with my seed-planting attachment fastened thereon. Fig. 2 is a longitudinal section of the same through the line $x\ x$, Fig. 1.

A represents the frame, B the handles, and $a$ the teeth, of a common harrow, such as are generally used by cotton-planters. When this harrow is to be used with my attachment the front tooth is removed and a furrow-opener, C, inserted in lieu thereof. The dropper or sower consists of a square box, D, secured upon a central shaft, $b$, and provided with a slot, $d$, cut across each corner to let the seed drop through. The ends of the shaft $b$ are turned down to form tenons, which are held in staples or screw-eyes $e$ on top of the harrow-frame A. The seed-dropper D is revolved by means of a rope or belt, $f$, passing around a pulley on the shaft or axle $b$, and around the axle $h$ of a wheel, E, at the rear end of the harrow, said axle $h$ having its bearings in or under the rear ends of the side beams of the harrow-frame. The coverer is simply a board, G, attached to the rear teeth of the harrow, as shown in Fig. 2. When thus arranged the planter will sow or distribute the seed regularly. The seed-box being square, and revolving, insures that the seed will fall or drop through the slots regularly.

The invention is cheap and simple, and may easily be attached to any common harrow, and can be easily detached from the harrow whenever desired.

Having thus fully described my invention, what I claim as new, and desire to secure by Letters Patent, is—

In combination with a harrow-frame, A, having teeth $a\ a$, the detachable rectangular box D, with slots $d\ d$ in each corner thereof, and the detachable shaft and wheel $h$ E and cord $f$, all substantially as and for the purposes herein set forth.

In testimony that I claim the foregoing I have hereunto set my hand this 31st day of August, 1874.

WILLIAM J. COVINGTON.

Witnesses:
   A. T. WOLFE,
   J. J. PORTER.